United States Patent Office 3,078,412
Patented Feb. 19, 1963

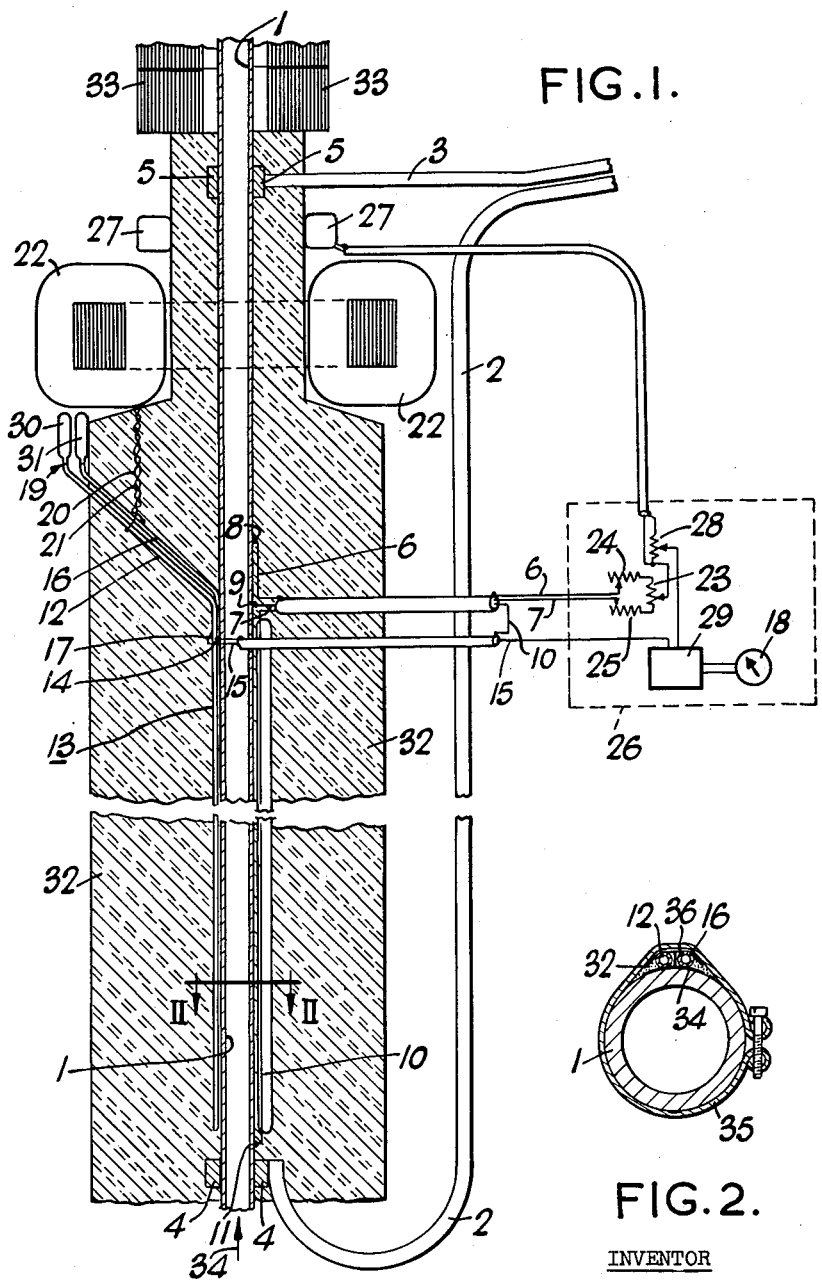

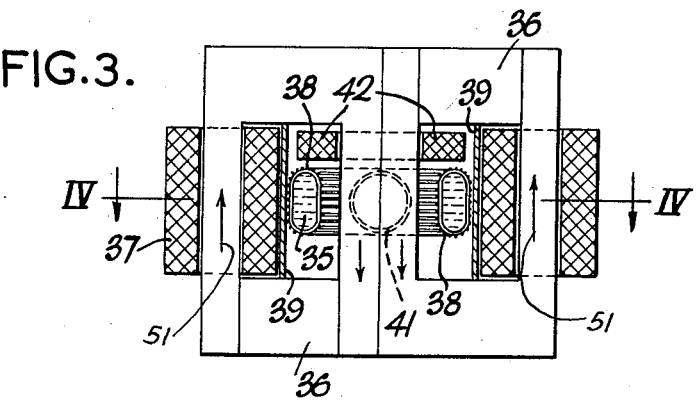
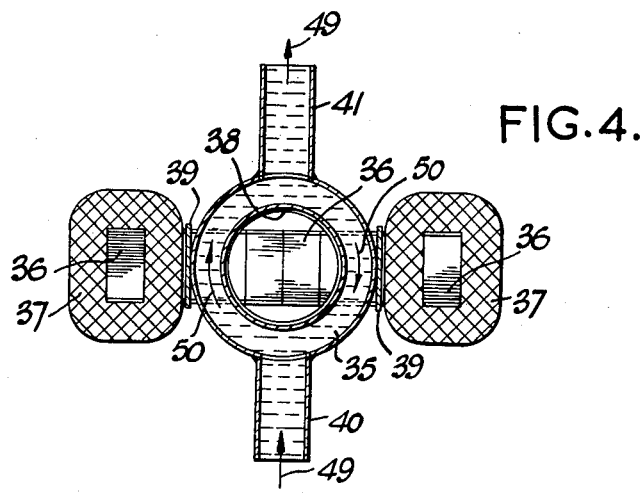
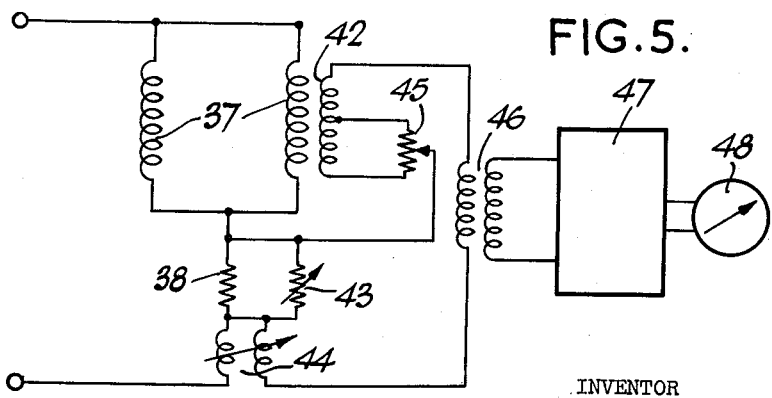

3,078,412
APPARATUS FOR INDICATING THE METAL
OXIDE CONTENT OF A LIQUID METAL
Leslie Reginald Blake, Thurso, North Scotland, assignor to United Kingdom Atomic Energy Authority, London, England
Filed June 3, 1959, Ser. No. 817,875
Claims priority, application Great Britain June 3, 1958
4 Claims. (Cl. 324—64)

This invention relates to apparatus for measuring small changes of electrical resistivity of liquid metals and the invention is primarily concerned with such measurement for indicating the metal oxide content of a liqiud metal but it may also serve for indicating the presence of other impurities including gas bubbles, or oxide particles which may be released inadvertently from an oxide trapping device through which the liquid metal passes.

The indication of metal oxide content is important as the metal oxide in the liquid metal can cause corrosion of materials which are not corroded by the liquid metal itself. The indication of the presence of bubbles can serve to give warning of either a leak in a heat exchanger through which the liquid metal passes, or, where the liquid metal is used in a nuclear reactor, of a burst fuel element from which fission product gases are leaking. The presence of oxide particles may indicate failure of an oxide trapping device employed for the removal of the oxide from the liquid metal stream.

The indications obtained are characteristic, gas bubbles giving high, sharp peaks and oxide particles give small sharp peaks on a suitable recording instrument whilst changes in metal oxide content are shown as smooth changes.

According to the present invention apparatus for measuring small changes of electrical resistivity of liquid metals due to the presence of metal oxide, impurities or gas bubbles, comprises a pipe for liquid metal, means causing the passage of an alternating current through liquid metal in the pipe, and means for deriving two voltages, one being that due to the current through the liquid metal in the pipe and the other being a reference voltage which is representative of the same current through the same liquid metal but having a fixed oxide, impurity, and gas bubble content.

By way of example, the invention will now be described with reference to the accompanying drawings in which FIG. 1 is a sectional elevation of one form of the invention, FIG. 2 is a section on the line II—II of FIG. 1, FIG. 3 is a sectional elevation of another form of the invention, FIG. 4 is a section on the line IV—IV of FIG. 3, and FIG. 5 is a circuit diagram appertaining to FIGS. 3 and 4.

Referring to FIGS. 1 and 2, apparatus for measuring small changes of electrical resistivity of liquid sodium comprises a stainless steel pipe 1 for the liquid sodium, electrical conductors 2, 3 from an alternating current supply transformer, the conductors 2, 3 being connected to the pipe 1 at connecting lugs 4, 5 respectively. Probe leads 6, 7 are connected adjacent the upper end of the pipe 1 at points 8, 9 respectively and, a looped temperature compensating probe lead 10 is connected at one of its ends to the pipe 1 at a point 11 and at the other end to one limb 12 of a stainless steel U-tube 13 at a point 14. A probe lead 15 is connected to the other limb 16 of the U-tube 13 at a point 17. The probe leads 6, 7, 10, 15 extend to an electrical circuit 26 in a manner to be detailed subsequently which circuit has a meter 18 for comparison of the voltage between the points 11, 8 in the pipe 1 with the voltage between the points 14, 17 in the U-tube 13. The U-tube 13 is filled with liquid sodium of fixed sodium oxide, impurity, and gas bubble content to the level shown by lines 19, and the limbs 12, 16 are connected by leads 20, 21 respectively to a current transformer 22.

In the circuit 26, the probe leads 6, 7 are connected to a balance potentiometer 23, two variable resistors 24, 25 being provided in series with the potentiometer 23 enabling sealing adjustment to zero. An air cored toroid 27 is connected in series with a tapping on the balance potentiometer 23 and feeds a potentiometer 28 having a tapping to an amplifier and phase-sensitive detector 29. The meter 18 and the probe lead 15 are connected to the amplifier 29.

The limbs 12, 16 of the U-tube 13 have expansion chambers 30, 31 respectively and the U-tube 13 is electrically isolated from the pipe 1 by mica tape 34 (FIG. 2 only). The pipe 1 and the U-tube 13 are held in close thermal contact by a copper band 35 (FIG. 2 only) and are surrounded by thermal insulation 32, the limbs 12, 16 of the U-tube 13 being electrically separated where they are parallel to each other and electrically separated from the band 35 by mica tape 36 (FIG. 2 only). The pipe 1 is surrounded by a magnetic core 33 above the lug 5.

The pipe 1 is 0.526 inch O.D. and 0.390 inch I.D., the U-tube 13 is 0.050 inch O.D. and 0.037 inch I.D., the lugs 4, 5 are thirty-six inches apart and the points 8, 11 are thirty inches apart.

The design of the apparatus is based on the finding that the electrical resistivity of liquid sodium increases approximately linearly with increasing oxygen content. The rate of increase is about 0.01 to 0.02% per part per million oxygen by weight.

In operation, liquid sodium bows through the pipe 1 as indicated by arrow 34. The electrical supply is of low voltage, and 50 cycles per second frequency, giving about two hundred amps. current along the liquid sodium in the pipe 1. The meter 18 indicates the difference in the voltages between the points 11, 8 and the points 14, 17. The voltage between the points 11, 8 is due to the current through the liquid sodium in the pipe 1. The voltage between the points 14, 17 on the U-tube 13 serves as a reference voltage which is representative of the same current through the same liquid metal but having a fixed oxide, impurity, and gas bubble content. This relation is achieved by virtue of the filling of the U-tube 13 with liquid sodium of fixed sodium oxide, impurity, and gas bubble content, the connecting of the U-tube 13 to the current transformer 22 which is linked to the current flowing in the pipe 1, and the close proximity of the U-tube 13 to the pipe 1 thereby giving the U-tube 13 a high speed of response to temperature changes in the pipe 1 (the chambers 30, 31 allowing for thermal expansion in the U-tube 13).

The toroid 27 balances out a quadrature component arising from probe lead inductance effects and current transformer magnetising inductance. The magnetic core 33 cuts down by-pass current in the pipe 1.

Referring to FIGS. 3, 4 and 5, apparatus for measuring small changes of electrical resistivity of liquid sodium comprises a stainless steel ring pipe 35 having a magnetising circuit of two symmetrical loops, each loop having a laminated core 36 of high permeability with a magnetising winding 37. The pipe 35 has a nickel comparator coil 38, the coil 38 being non-inductively wound and in close thermal contact with, but electrically insulated from, the pipe 35. Thermal insulation 39 is provided between the pipe 35 and the windings 37, and the pipe 35 has stainless steel connections 40, 41. The cores 36 are both looped by the turns of a probe coil 42 situated closely adjacent the toroid. FIG. 5 shows the electrical circuit for the apparatus. A resistance 43 is connected in parallel with the coil 38, the resistance 43 having a low temperature coefficient of resistivity and being adjustable.

The circuit has a mutual inductance 44, a "zero-set" potentiometer 45, and a matching transformer 46 connected to a phase sensitive rectifier 47 and a meter 48. The pipe 35 has an I.D. of 2⅜ inches, an O.D. of 3⅝ inches and walls 1/16 inch thick.

In use, liquid sodium flows through the apparatus as indicated by arrows 49 and a current is induced directly into the pipe 35 owing to variation of flux in the core loops 36. The instantaneous flux direction is indicated by arrows 51 and the current direction is indicated by arrows 50. Owing to the symmetrical disposition of the cores there is no potential difference between the inlet 40 and the outlet 41 so that no current flows in pipework external to the toroid. In the probe coil 42 there is generated a voltage dependent upon the flux in the central legs of the core loops 36 and thus representative of the alternating current induced in the loop pipe. The meter 48 indicates the difference in the voltages in the probe coil 42 and the reference coil 38.

The voltage drop provided by the combination of the resistances 38, 43 and 45 serves as a reference voltage which is representative of the same current through the same liquid metal but having a fixed oxide, impurity and gas bubble content. This reference voltage is adjustable to different levels by alteration of the setting of the "zero-set" potentiometer 45, the method employed to obtain resistivity readings being to adjust this potentiometer until the meter 48 registers zero and then deduce the resistivity from the potentiometer setting. Preferably the potentiometer is calibrated in terms of resistivity. The close proximity of the coil 38 to the pipe 35 gives the coil 38 a high speed of response to temperature changes in the pipe 35. The resistance 43 is adjusted so that the coil 38 (which is of high resistivity temperature coefficient) and the resistance 43 in parallel have the same resistivity temperature coefficient over a particular temperature range, as the pipe 35 when filled with liquid sodium of fixed sodium oxide, impurity and gas bubble content.

The mutual inductance 44 provides for quadrature balance. In an alternative form, the coil 38, the resistance 43 and the mutual inductance 44 are connected in series.

Both forms of apparatus described above with reference to the drawings have application in the cooling circuits of liquid metal cooled nuclear reactors.

Both forms of apparatus can be used to indicate the metal oxide content of liquid metals other than sodium, such as for example potassium and sodium potassium alloys.

I claim:

1. As part of a procedure for the removal of metal oxide from a flowing liquid metal, a method of detecting metal oxide remaining in the liquid metal stream which comprises the steps of passing said liquid metal in a closed loop with opposed inlet and outlet connections, electromagnetically inducing alternating electrical current flow in liquid metal within said loop with equal electrical potentials at said inlet and outlet connections through a coil linked with said loop, modifying said voltage proportionately to the effect of temperature changes of said liquid metal on the resistivity thereof, and detecting the resistivity of said liquid metal from said voltage as modified to provide an indication of the presence of oxide therein.

2. Apparatus for measuring small changes of electrical resistivity of flowing liquid metal due to the presence of metal oxide in the liquid metal stream and comprising a closed loop pipe with opposed inlet and outlet connections, a pair of magnetic core loops linked symmetrically with the loop pipe at diagonally opposed positions, induction coils wound respectively around the cores to induce on energization with alternating current a flow of alternating current in the liquid metal flowing in the loop pipe, a probe coil looping both cores closely proximate to the loop pipe to derive a voltage representative of the alternating current in the loop pipe, a temperature compensating electrical resistance disposed to be in thermal equilibrium with the loop pipe and connected in series with the probe coil in an electrical circuit, and means for detecting voltage change in the electrical circuit to provide an indication of changes of electrical resistivity of the liquid metal.

3. Apparatus as claimed in claim 2 wherein a variable resistance having a low temperature co-efficient of resistivity is connected in parallel across the temperature compensating resistance whereby the temperature co-efficient of resistivity of the resistance combination comprising the temperature compensating resistance and the variable resistance can be adjusted to match the temperature co-efficient of resistivity of the liquid metal.

4. Apparatus for measuring small changes of electrical resistivity of flowing liquid metal due to the presence of metal oxide in the liquid metal stream and comprising a closed loop pipe with opposed inlet and outlet connections, a pair of magnetic core loops linked symmetrically with the loop pipe at diagonally opposed positions, induction coils wound respectively around the cores to induce on energization with alternating current a flow of alternating current in the liquid metal flowing in the loop pipe, a probe coil looping both cores closely proximate to the loop pipe to derive a voltage representative of the alternating current induced in the loop pipe, a temperature compensating electrical resistance disposed to be in thermal equilibrium with the loop pipe and connected in series with the probe coil in an electrical circuit, connections between the temperature compensating electrical resistance and the induction coils to cause a temperature compensating voltage to be applied in opposition to the derived voltage in the circuit, a variable resistance having a low temperature co-efficient of resistivity connected in parallel across the temperature compensating resistance whereby the temperature co-efficient of resistivity of the resistance combination can be adjusted to match the temperature co-efficient of resistivity of the liquid metal, and a detector electromagnetically linked with the electrical circuit to detect voltage changes in the electrical circuit to provide an indication of changes of electrical resistivity of the liquid metal.

References Cited in the file of this patent

UNITED STATES PATENTS

| | | |
|---|---|---|
| 1,379,266 | Keeler | May 24, 1921 |
| 2,296,867 | Osborne | Sept. 29, 1942 |
| 2,383,450 | Coleman | Aug. 28, 1945 |
| 2,396,420 | Hayward et al. | Mar. 12, 1946 |
| 2,599,413 | Reichertz | June 3, 1952 |
| 2,709,785 | Fielden | May 31, 1955 |
| 2,869,071 | Esterson | Jan. 13, 1959 |

OTHER REFERENCES

Gupta et al.: "A Precision Electrode-Less Conductance Cell for Use at Audio Frequencies," Journal of Scientific Instruments, volume 33, August 1956; pages 313–314.